US012607135B2

(12) United States Patent
Benezech et al.

(10) Patent No.: US 12,607,135 B2
(45) Date of Patent: Apr. 21, 2026

(54) COLLECTOR FOR A DRAINED LIQUID FOR AN AIRCRAFT TURBINE ENGINE AND ASSOCIATED TURBINE ENGINE

(71) Applicant: SAFRAN HELICOPTER ENGINES, Bordes (FR)

(72) Inventors: Philippe Jean René Marie Benezech, Moissy-Cramayel (FR); Nicolas Rene Meyere, Moissy-Cramayel (FR); Nicolas Christophe Perra, Moissy-Cramayel (FR); Mathieu Pierre Cladiere, MOISSY-CRAMAYEL (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/859,359

(22) PCT Filed: Apr. 24, 2023

(86) PCT No.: PCT/FR2023/000048
§ 371 (c)(1),
(2) Date: Oct. 23, 2024

(87) PCT Pub. No.: WO2023/209285
PCT Pub. Date: Nov. 2, 2023

(65) Prior Publication Data
US 2025/0264041 A1     Aug. 21, 2025

(30) Foreign Application Priority Data
Apr. 25, 2022    (FR) ...................................... 2203831

(51) Int. Cl.
*F01D 25/32* (2006.01)
*B64D 33/00* (2006.01)

(52) U.S. Cl.
CPC ............. *F01D 25/32* (2013.01); *B64D 33/00* (2013.01)

(58) Field of Classification Search
CPC ...................................................... F01D 25/32
See application file for complete search history.

(56) References Cited

U.S. PATENT DOCUMENTS 10,017,238 B2    7/2018 Leon et al.
2020/0164998 A1   5/2020 Maffre et al.

FOREIGN PATENT DOCUMENTS

FR          3095836 A1    11/2020

OTHER PUBLICATIONS

International Search Reporting in corresponding International Application No. PCT/FR2023/000048, mailed Jun. 26, 2023, 2 pages, English Translation only.

*Primary Examiner* — Courtney D Heinle
*Assistant Examiner* — John S Hunter, Jr.
(74) *Attorney, Agent, or Firm* — Cozen O'Connor

(57) ABSTRACT

A collector for a drained liquid for an aircraft turbine engine includes an internal cavity having a first space for collecting the drained liquid and a second space for transferring the collected liquid to a recovery outlet; at least one inlet for the drained liquid, in fluid communication with the first space; and at least one recovery outlet, in fluid communication with the second space. The first space and the second space are separated from each other by a partition in which is arranged a means for restricting the passage of the drained liquid from the first space to the second space, the air in the first space being in communication with the air in the second space such that the air pressure in the first and second spaces is identical.

16 Claims, 4 Drawing Sheets

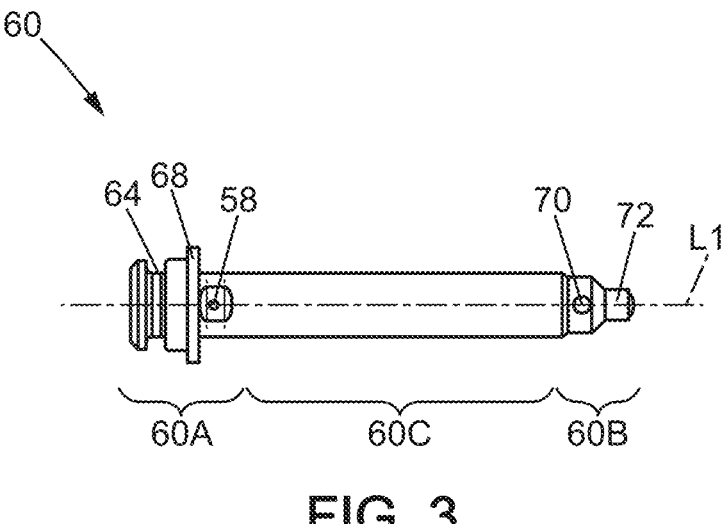
FIG. 3
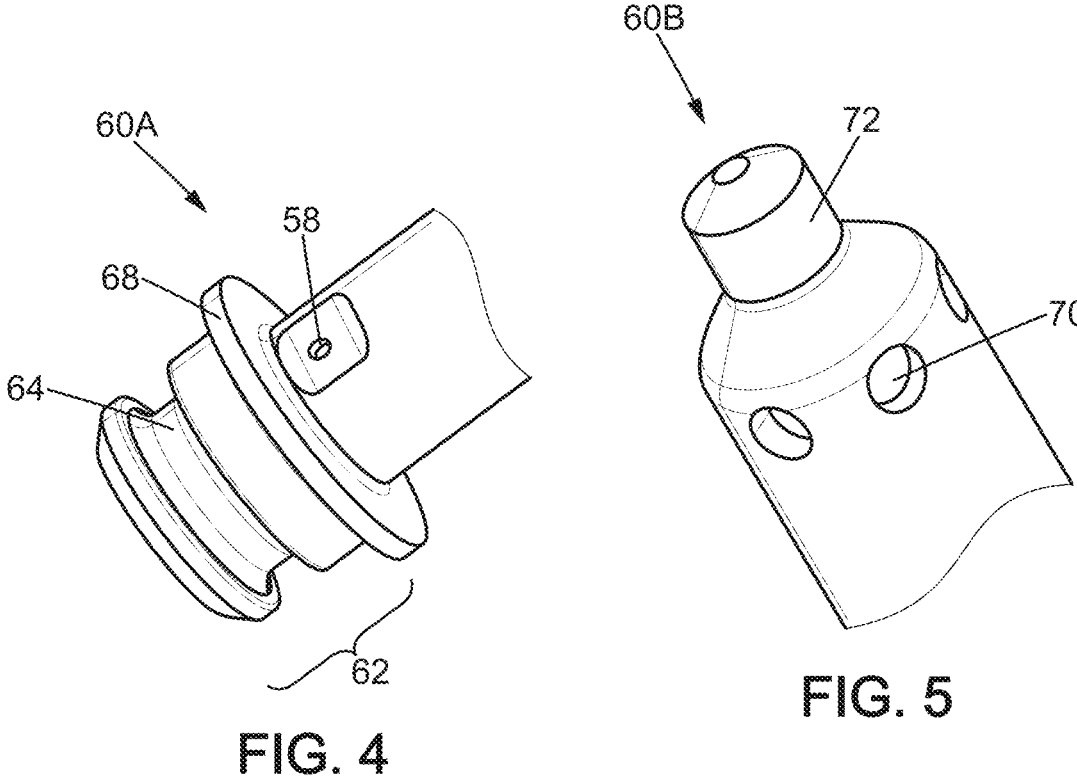
FIG. 4
FIG. 5

COLLECTOR FOR A DRAINED LIQUID FOR AN AIRCRAFT TURBINE ENGINE AND ASSOCIATED TURBINE ENGINE

CROSS-REFERENCE TO RELATED APPLICATIONS

This application is a US National phase Application of PCT/FR2023/000048 filed Apr. 24, 2023, which claims priority to French Patent Application No. 2203831 filed Apr. 25, 2022, both of which are hereby incorporated in their entirety.

TECHNICAL FIELD

This disclosure relates to the field of collectors for a drained liquid for an aircraft turbine engine.

PRIOR ART

In a turbine engine, it is often necessary to drain liquids of different types, such as fuel or oil, to prevent these liquids from accumulating and disrupting the nominal operation of the turbine engine. For example, some engines require drainage operations that result in losses of these liquids.

In order to recover these liquids, it is known to provide the turbine engine with a collector for drained liquid. Such a collector comprises an internal cavity which receives the liquid drained from the different parts of the turbine engine. The collector further comprises an inlet for drained liquid, which connects the exterior of the collector to its internal cavity, and a recovery outlet for this liquid. The recovery outlet connects the internal cavity of the collector to other parts of the turbine engine, for example to a fuel tank.

The collector is often configured to direct the collected liquid to the recovery outlet as long as the amount of drained liquid reaching the internal cavity of the collector is not very high, which allows the drained liquid to be reused.

Conventionally, the recovery outlet is provided with a passage restriction means for restricting the passage of drained liquid, arranged at the interface between the interior of the collector and the exterior of the collector. The passage restriction means forms a nozzle which measures the flow rate of the drained liquid exiting the collector through the recovery outlet. The nozzle allows controlling the flow rate of drained liquid exiting the collector. In particular, the nozzle counters the flow resistance of the drained liquid which is dependent on the difference in pressure across the nozzle. Since the nozzle is arranged at the interface between the interior and exterior of the collector, the pressure difference across the nozzle is equivalent to a pressure difference between the interior and the exterior of the collector.

When the pressure difference across the nozzle increases sufficiently, the flow resistance of the nozzle is compensated for, and the drained liquid is able to flow through it.

The pressure difference across the nozzle turns out to depend solely on the amount of liquid collected in the internal cavity of the collector, so the flow rate of the liquid exiting through the nozzle is proportional to the amount of liquid in the collector. Thus, if the flow rate of the liquid exiting the nozzle is very high, this means that there is a very large amount of liquid in the collector, which can help in identifying a failure in the turbine engine.

However, it has been found that the operating conditions of the collector, such as the increase in air pressure in the internal cavity of the collector or the flow rate of drained liquid entering the internal cavity, as well as the installation conditions of the collector, for example the length of the pipes at the outlet of the collector, also have an impact on the pressure difference across the nozzle. Such parameters therefore modify the relationship between the amount of liquid drained into the internal cavity and the flow rate of drained liquid exiting through the recovery outlet, which can lead to erroneously detecting a failure of the turbine engine or not identifying an actual malfunction of the turbine engine.

Furthermore, when the nozzle is in service it tends to clog, which can harm its operation or even render it inoperative.

SUMMARY

This disclosure improves the situation.

To this end, a collector for a drained liquid for an aircraft turbine engine of a first type is proposed, the collector comprising:

- an internal cavity comprising a first space for collecting the drained liquid and a second space for transferring the collected liquid to a recovery outlet;
- at least one inlet for the drained liquid, in fluid communication with the first space; and
- at least one recovery outlet, in fluid communication with the second space;

wherein the first space and the second space are separated from each other by a liquid-tight partition in which is arranged a drained liquid passage restriction means which restricts the passage of the drained liquid from the first space to the second space, the air in the first space being in communication with the air in the second space such that the air pressure is identical in the first space and in the second space.

Since the air pressure is identical in the first space and in the second space, the pressure difference across the drained liquid passage restriction means depends solely on the height of the drained liquid collected in the first space. "Across the passage restriction means" is understood to mean the inlet into the restriction means and the outlet from the restriction means. More precisely, the inlet into the restriction means corresponds to the outlet from the first space, while the outlet from the restriction means corresponds to the inlet into the second space.

Due to the equalization of pressures in the first space and the second space, other variables, such as the increase in air pressure, the flow rate of the drained liquid into the internal cavity, or the increase in the lengths of the pipes at the outlet from the collector, do not impact the pressure difference across the drained liquid passage restriction means.

This document also relates to a collector for a drained liquid for an aircraft turbine engine of a second type, the collector comprising:

- an internal cavity comprising a first space for collecting the drained liquid and a second space for transferring the collected liquid to a recovery outlet, the internal cavity extending longitudinally in a first direction between a first end closed off by a bottom wall of the collector and a second end closed off by a cover of the collector;
- at least one inlet for the drained liquid, in fluid communication with the first space; and
- at least one recovery outlet, in fluid communication with the second space;

wherein the first space and the second space are separated from each other by a liquid-tight partition in which is arranged a drained liquid passage restriction means which restricts the passage of the drained liquid from the first space to the second space, wherein the drained liquid passage restriction means is mounted so as to be removable from the collector by moving the drained liquid passage restriction means along the first direction, in the directional sense that is from the bottom wall of the collector towards the cover of the collector.

Since the drained liquid passage restriction means is mounted so as to be removable relative to the collector, it is possible to extract it from the collector for easy cleaning as well as for checking it regularly for clogging.

Furthermore, since the restriction means is removed from the collector by moving it along the first direction in the directional sense that is from the bottom wall of the collector towards the cover of the collector, it is extracted through the second end of the internal cavity, which prevents the drained liquid from leaking through the bottom wall of the collector. This configuration also avoids the use of seals, for example made of elastomer, for ensuring liquid-tightness of the collector's bottom wall. The resistance of the collector to a fire in the engine floor is thus improved.

According to one aspect of the invention, the partition is a partition removably mounted in the internal cavity of the collector. Alternatively, the partition is a partition fixedly mounted in the internal cavity of the collector, or even formed as one piece with a wall of the internal cavity.

According to one aspect, the at least one recovery outlet is an outlet connected to a fuel tank of the turbine engine. Alternatively, said at least one recovery outlet is an outlet connected to a recovery tank also called an "ecology" tank. This ecology tank is configured to store the drained liquids when they are not returned to the fuel tank. One will note that due to the identical air pressure in the first space and second space, the difference in fluid height between the collector and the fuel tank or ecology tank has no impact on the pressure difference across the drained liquid passage restriction means.

According to one aspect, the drained liquid passage restriction means is formed in the partition. For example, the passage restriction means comprises at least one orifice that traverses the partition. The partition orifice allows the drained liquid to flow from the first space to the second space.

Alternatively, the drained liquid passage restriction means may be an attached nozzle installed in an opening of the partition.

According to one aspect, the partition is thin-walled. "Thin-walled" is understood to mean that the thickness of the partition is less than 1.5 mm, preferably less than 1 mm.

According to one aspect, the orifice has a diameter of less than 1.5 mm, preferably less than 1 mm.

According to one aspect, the drained liquid passage restriction means comprises at least two orifices which traverse the partition. In this case, in order to preserve the same law governing the flow of drained liquid between the first and second spaces of the cavity as when the passage restriction means comprises only one orifice, the orifices of the partition preferably have a diameter that is less than the diameter of the partition orifice when there is only one.

According to one aspect, the drained liquid passage restriction means comprises at least two orifices which traverse the partition at different heights. In this case, the fill level of drained liquid at which the drained liquid traverses each orifice of the partition into the internal cavity is different, the orifices located at a lower height being traversed at a lower fill level than those located higher up.

According to one aspect, the collector further comprises a discharge outlet that is fluidly connected to an overflow channel, for example arranged in the first space of the internal cavity.

The discharge outlet is in communication with the exterior of the turbine engine. The overflow channel has a defined height which makes it possible to determine a fill level, in the internal cavity of the collector, above which the drained liquid flows through the discharge outlet.

According to one aspect, the overflow channel comprises an inlet port for the intake of liquid collected in the first space, said inlet port being arranged at a height that is greater than the height of the drained liquid passage restriction means.

Here, height is understood to mean the dimension measured in the longitudinal direction of the collector in its service position. Depending on the diameter of the orifice of the restriction means and the height of the inlet port of the overflow channel, it is possible to determine a detection threshold for drained liquid leakage from the turbine engine, beyond which the drained liquid flows through the discharge outlet. When this threshold is exceeded, the amount of drained liquid reaching the internal cavity is very large, which may indicate that there is a failure in the turbine engine.

According to one aspect, the partition forms a tube delimiting the second space.

According to the invention, the tube is arranged in the internal cavity, extending between a bottom wall of the collector and a cover of the collector. More specifically, the tube extends from the bottom wall of the collector towards the cover of the collector. The tube has, for example, a cylindrical shape with a circular cross-section.

Advantageously, the drained liquid recovery outlet is fluidly connected to the internal cavity of the collector, through the bottom wall of the collector.

According to one aspect, the tube extends in a longitudinal direction and comprises a first end part carrying the drained liquid passage restriction means and a second end part carrying at least one pressure-balancing orifice which places the air of the first space in communication with the air of the second space.

According to the invention, the first end part is directly connected to the bottom wall of the collector. The drained liquid passage restriction means is therefore arranged near the bottom wall of the collector, such that the drained liquid flows between the first space and the second space at a low fill level of drained liquid in the first space.

The at least one pressure-balancing orifice allows placing the air of the first space in communication with the air of the second space, which allows equalizing the pressures between the first space and the second space. More precisely, the at least one pressure-balancing orifice is sized to ensure that the pressure in the second space is the same as in the first space. According to the invention, the diameter of the at least one pressure-balancing orifice is greater than 1.5 mm and less than 3 mm. For example, the diameter of the at least one pressure-balancing orifice is 2 mm.

According to one aspect, the second end part of the tube comprises at least two pressure-balancing orifices.

When several pressure-balancing orifices are provided, this facilitates the equalization of pressures between the first space and the second space of the internal cavity of the collector.

Advantageously, the tube comprises six pressure-balancing orifices distributed equidistantly around the longitudinal direction of the tube.

According to one aspect, the at least one pressure-balancing orifice has a diameter greater than the diameter of the drained liquid passage restriction means. This makes it possible to balance the pressures between the first and second spaces.

According to one aspect, the at least one pressure-balancing orifice is arranged at a height that is greater than the height of the inlet port for the intake of drained liquid into the overflow channel. This thus ensures that the drained liquid does not pass through the at least one pressure-balancing orifice since once the height of the inlet port for the intake of drained liquid into the overflow channel is reached, the drained liquid flows through this overflow channel towards the discharge outlet of the collector.

According to one aspect, the partition forms a tube mounted so as to be removable from the collector by moving the tube along the first direction, in the directional sense that is from the bottom wall of the collector towards the cover of the collector.

Since the tube is removably mounted, extraction of the drained liquid passage restriction means is thus facilitated.

Furthermore, since the tube is removably mounted, this facilitates its manufacture, even when its wall is thin. "Thin wall" is understood here to mean a wall with a thickness that is less than or equal to 2 mm, preferably less than 1 mm.

According to one aspect, the tube comprises a first end part directly connected to the bottom wall of the collector and a second end part connected to the cover of the collector.

The tube is thus held in position within the internal cavity of the collector.

According to another aspect, the drained liquid passage restriction means is comprised in the first end part of the tube, at a height located above the level of an inner face (20) of the bottom wall (16) of the collector. In particular, the passage restriction means is located at a height that is between the bottom wall of the collector and the cover of the collector.

Since the passage restriction means is comprised in the first end part of the tube, the drained liquid flows between the first space and the second space at a low fill level of drained liquid in the first space.

Since the passage restriction means is arranged at a height that is between the bottom wall of the collector and the cover of the collector, it is prevented from being arranged in an area where impurities accumulate in the collector. The areas where impurities accumulate are in particular those comprised in any housing or cavity provided in the bottom wall of the collector. This reduces the risk of clogging in the passage restriction means.

According to one aspect, the first end part of the tube comprises an insertion portion inserted into a housing in the bottom wall of the collector. The first end part of the tube is thus held in position in the bottom wall.

According to one aspect, the first end part comprises a stop member on the bottom wall, such as a flange, projecting radially outwards from the tube relative to the insertion portion, the stop member being arranged between the drained liquid passage restriction means and the insertion portion.

The insertion portion of the tube is thus inserted into the housing of the bottom wall of the collector until the stop member of the first end part of the tube abuts against the bottom wall of the collector. The arrangement of the tube in the internal cavity is thus guided and facilitated. In addition, since the stop member is arranged between the drained liquid passage restriction means and the insertion portion, this ensures that the restriction means is arranged at a height that is between the bottom wall and the cover of the collector, so as not to be arranged in an area where impurities accumulate.

According to one aspect, the insertion portion of the first end part of the tube comprises an annular groove in which is mounted a ring gasket that rests against an annular surface facing the housing.

Due to the annular groove and the ring gasket, the liquid-tightness of the connection between the bottom wall of the collector and the tube is improved.

According to one aspect, the second end part of the tube comprises at least one pressure-balancing orifice which traverses the tube between the first space and the second space of the internal cavity.

The at least one pressure-balancing orifice places the air of the first space in communication with the air of the second space, so that the air pressure is identical in the first space and second space.

According to one aspect, the second end part comprises a connecting pin for connecting the tube to the cover of the collector.

According to one aspect, the cover of the collector comprises a cap having a shape that is complementary to the shape of the connecting pin of the tube.

According to the invention, the length of the flow rate restriction means is such that it extends from the bottom wall to the cover of the collector. Since the cap has a shape that is complementary to the shape of the connecting pin of the tube, this ensures that the second end part is locked in the internal cavity of the collector. In particular, the cap is sized so as to compensate for play of the second end part, and more precisely so as to reduce the vibrations of the second end part of the tube which may be caused by the drained liquid collected in the first space of the internal cavity.

According to one aspect, the cover of the collector is removable. Extraction of the passage restriction means is thus facilitated.

According to one aspect, the collector further comprises a discharge outlet fluidly connected to an overflow pipe arranged in the first space of the internal cavity, wherein the overflow pipe forms, with the tube, an assembly that is removable by moving said assembly along the first direction, in the directional sense that is from the bottom wall of the collector towards the cover of the collector.

According to another aspect, the diameter of the passage restriction means is less than or equal to 1.5 mm, preferably less than 1 mm. The flow rate of drained liquid that can travel from the first space to the second space in order to go to the first outlet is thus limited.

According to another aspect, the thickness of the passage restriction means is less than or equal to 2 mm, preferably less than 1 mm. The nozzle is thus a thin-walled nozzle.

According to another aspect, a turbine engine such as a turbojet or turboprop engine is provided, comprising at least one collector of the first type or of the second type as described above.

BRIEF DESCRIPTION OF DRAWINGS

Other features, details and advantages will become apparent from reading the detailed description below, and from analyzing the attached drawings, in which:

FIG. 3 shows a tube comprised in the collector of FIG. 2.

FIG. 4 shows a first end part of the tube of FIG. 3.

FIG. 5 shows a second end part of the tube of FIG. 3.

DESCRIPTION OF EMBODIMENTS DETAILED DESCRIPTION

Figure 1:
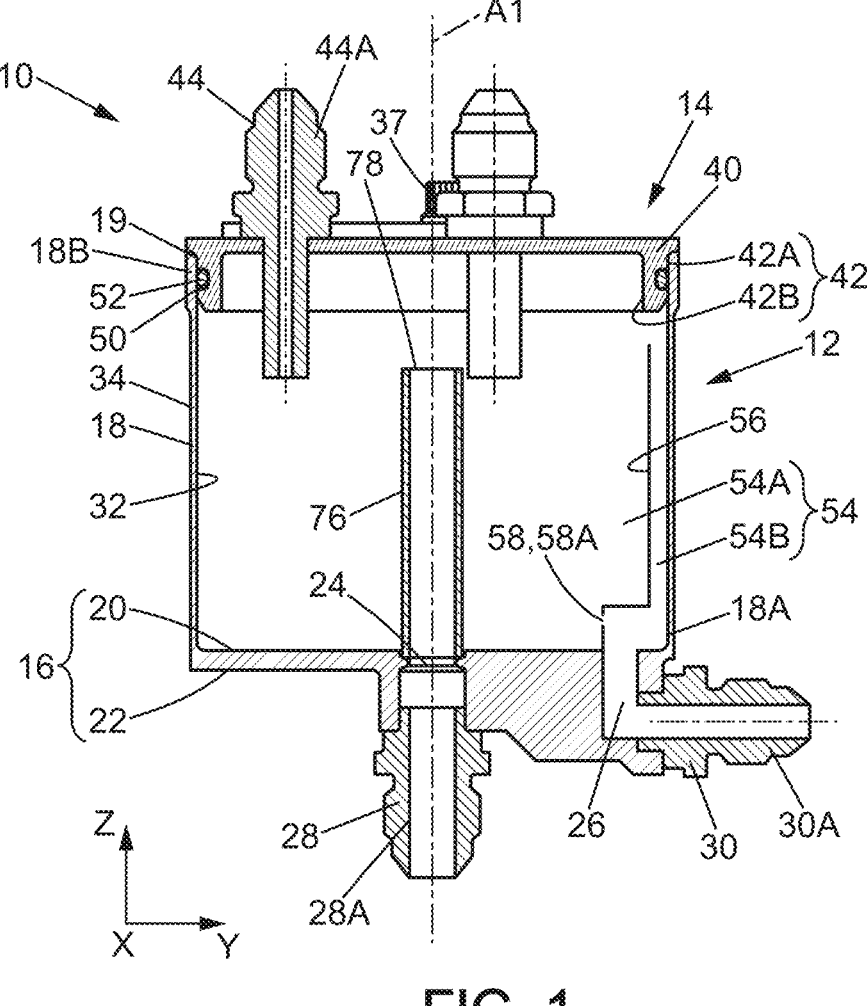
FIG. 1 shows a collector for a drained liquid for an aircraft turbine engine according to a first embodiment.
Figure 2:
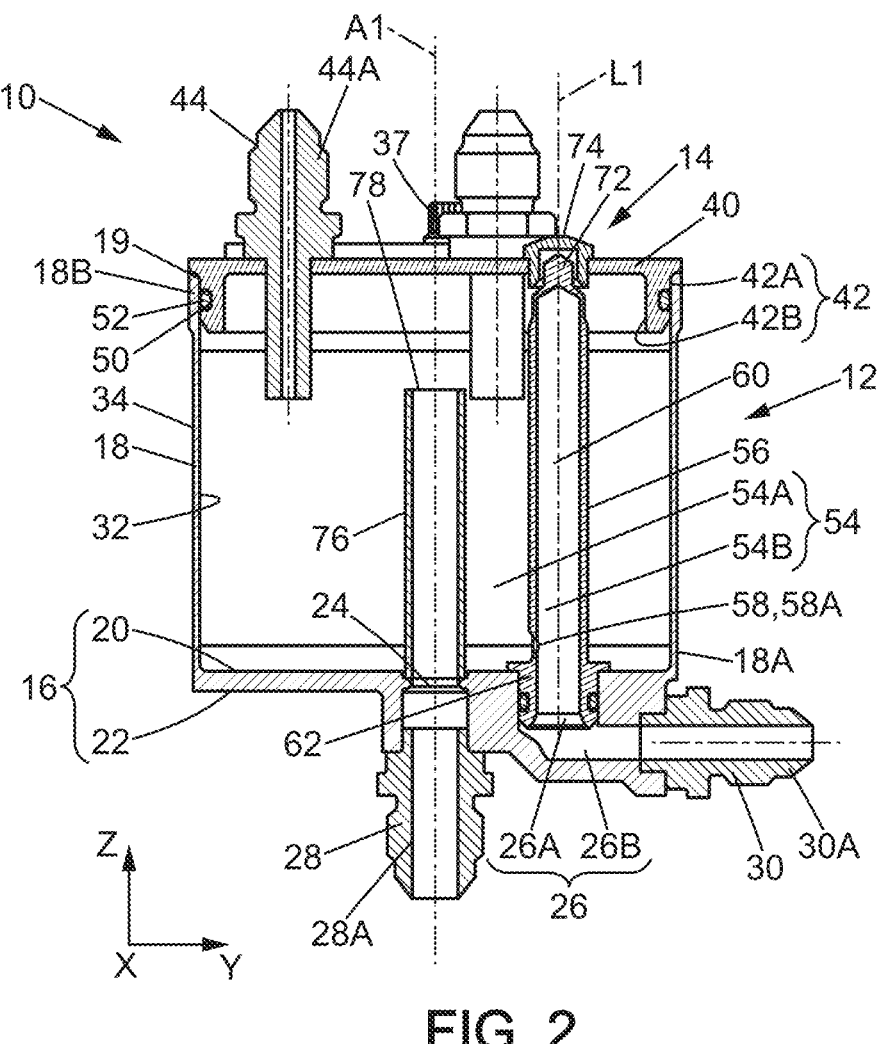
FIG. 2 shows a collector for a drained liquid for an aircraft turbine engine according to a second embodiment.

FIGS. 1 and 2 show a collector 10 for a drained liquid for an aircraft turbine engine. Collector 10 comprises a body 12 and a cover 14.

Body 12 has a cylindrical shape with a substantially vertical axis A1. In the following, "vertical" means along a direction Z that is substantially parallel to axis A1. In the figures, body 12 has a substantially circular cross-section, but it could also have a polygonal cross-section.

Body 12 comprises a bottom wall 16 and a side wall 18.

Bottom wall 16 preferably has a cross-section whose shape and dimension are equivalent to the shape and dimension of the cross-section of body 12. "Cross-section" is understood here to mean comprised within an X-Y plane perpendicular to axis A1. Bottom wall 16 comprises an inner face 20 and an outer face 22.

Bottom wall 16 comprises at least a first cavity 24 and a second cavity 26. In the non-limiting examples of FIGS. 1 and 2, first cavity 24 passes substantially vertically through bottom wall 16 between its inner face 20 and its outer face 22. In FIG. 1, second cavity 26 extends substantially vertically from inner face 20 of bottom wall 16, without passing through outer face 22. In FIG. 2, second cavity 26 has a shape that is substantially an L, with a first portion 26A extending substantially vertically 26, and a second portion 26B extending substantially transversely.

First cavity 24 places the interior of collector 10 in communication with at least one first outlet 28, referred to as the discharge outlet, while second cavity 26 places the interior of collector 10 in communication with at least one second outlet 30, referred to as the recovery outlet. Discharge outlet 28 and recovery outlet 30 will be described below.

Side wall 18 extends substantially in vertical direction Z from inner face 20 of bottom wall 16. Side wall 18 forms a closed surface extending around axis A1 and comprising a radially inner face 32 and a radially outer face 34. "Radially" here corresponds to any direction perpendicular to vertical direction Z. Preferably, side wall 18 is substantially cylindrical with a cross-section that is equal, in shape and dimension, to the cross-section of bottom wall 16.

Figure 6:
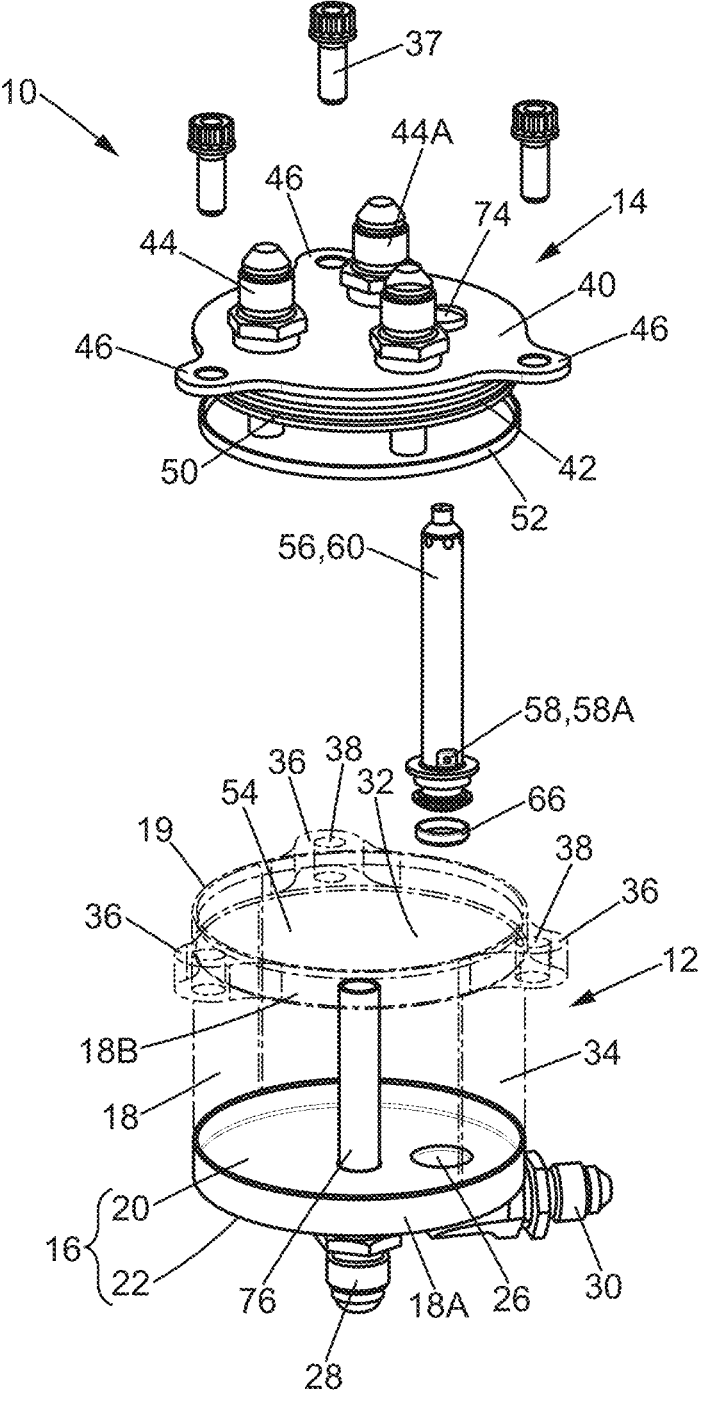
FIG. 6 shows an exploded view of the collector of FIG. 2.

Side wall 18 comprises a first end part 18A directly connected to bottom wall 16 and a second end part 18B vertically opposite first end part 18A. According to one non-limiting example, second end part 18B of side wall 18 comprises a free end 19. In other words, body 12 does not comprise any wall opposite to bottom wall 16 along direction Z. As can be seen in FIG. 6, second end part 18B of side wall 18 may comprise one or more portions 36 projecting transversely outward relative to the collector, from radially outer face 34 of side wall 18 of collector 10. In the illustrated case, side wall 18 comprises three projecting portions 36, without this being limiting. Each of portions 36 comprises a hole 38 shaped to receive a respective removable connection means 37 for connecting cover 14 to body 12, as will be detailed below. Each removable connection means 37 is for example a screw or a rivet.

Cover 14 comprises a wall 40 intended to be vertically positioned so it faces bottom wall 16. The external periphery of wall 40 is intended to come into contact with free end 19 of end part 18B.

Wall 40 preferably has a cross-section whose shape and dimension are advantageously equivalent to the shape and dimension of bottom wall 16. In certain cases, the dimension of the cross-section of wall 40 is greater than the dimension of bottom wall 16.

Wall 40 is traversed substantially vertically by at least one inlet 44 for the drained liquid. Three inlets 44 are shown in FIG. 6, without this being limiting. Each inlet 44 comprises a connector 44A for connecting a pipe (not shown) to respective inlet 44, through which the drained liquid flows until it reaches collector 10.

As is clear from FIG. 6, wall 40 further comprises one or more portions 46 projecting transversely outward relative to the collector. Advantageously, the number of portions 46 of wall 40 is equal to the number of portions 36 of side wall 18 of body 12. Portions 46 are arranged so that when cover 14 is placed on body 12, each portion 46 of wall 40 is vertically positioned so it faces a respective portion 36 of side wall 18. In FIG. 6, wall 40 comprises three portions 46, without this being limiting. Each of portions 46 comprises a hole 48 shaped to receive the respective removable connection means 37 for connecting cover 14 to body 12, as will be detailed below.

An annular rim 42 intended to be radially facing end part 18B of the side wall extends from wall 40. In particular, annular rim 42 extends from wall 40 substantially perpendicularly to wall 40. The annular rim preferably has a shape that is complementary to the cross-section of side wall 18 so that when cover 14 is arranged on body 12 of the collector, the annular rim is engaged with, for example fitted to, the interior of body 12, in particular transversely next to second end part 18B of side wall 18. One will note that the term "annular" here does not assume a circular rim. On the contrary, the term "annular" here concerns any closed shape, regardless of its geometry.

Annular rim 42 comprises a radially outer edge 42A which faces radially inner face 32 of side wall 18 of body 12, and a radially inner edge 42B.

In order to ensure the liquid-tightness of collector 10 when cover 14 is arranged on body 12, annular rim 42 may comprise a groove 50 extending along its entire radially outer edge 42A. Groove 50 is in particular shaped to receive a seal 52 having a shape complementary to the shape of groove 50.

As indicated above, body 12 and cover 14 are connected by removable connection means 37. Cover 14 is thus removable from body 12.

When cover 14 is arranged on body 12, an internal cavity 54 is formed in collector 10. Internal cavity 54 is in particular delimited by inner face 20 of bottom wall 16, radially inner face 32 of side wall 18, and cover 14. Internal cavity 54 therefore extends longitudinally along direction Z between a first end closed off by bottom wall 16 of collector 10 and a second end closed off by cover 14.

Internal cavity 54 comprises a first space 54A and a second space 54B which are separated by a partition 56. Partition 56, which will be described in more detail below, is preferably thin-walled. "Thin-walled" is understood to mean that the thickness of partition 56 is less than 1.5 mm, preferably less than 1 mm.

As can be seen in FIGS. 1 and 2, each inlet 44 of the collector is in fluid communication with first space 54A. The drained liquid is thus initially collected in first space 54A, which will also be referred below to as the collection space 54A.

Second space 54B is in fluid communication with recovery outlet 30. In particular, second space 54B transfers the liquid collected in collection space 54A, to recovery outlet 30. Also, in the following description, second space 54B will also be referred to as transfer space 54B. Recovery outlet 30 comprises a connector 30A for connecting a pipe (not shown) to collector 10, extending between the collector and another part of the turbine engine, such as the fuel tank or the "ecology" collection tank described above. The drained liquid may thus be recovered from collector 10 and sent to other parts of the turbine engine for storage or reuse.

Partition 56 is liquid-tight. To allow the liquid collected in collection space 54A to travel to transfer space 54B, partition 56 comprises drained liquid passage restriction means 58 which restrict the passage of the drained liquid from collection space 54A to transfer space 54B.

In the figures, restriction means 58 extends radially, without this being limiting. In particular, restriction means 58 may extend in any spatial direction provided that the inlet to restriction means 58 corresponds to an outlet from collection space 54A and the outlet from restriction means 58 corresponds to an inlet to transfer space 54B.

Restriction means 58 may comprise an orifice 58A which traverses partition 58 between collection space 54A and transfer space 54B. The diameter of orifice 58A is less than or equal to 1.5 mm, preferably less than 1 mm. This makes it possible to ensure that the passage of drained liquid from collection space 54A to transfer space 54B occurs in a controlled manner.

Alternatively, restriction means 58 may comprise a plurality of orifices which traverse partition 56 between collection space 54A and transfer space 54B. In this case, each orifice may have a diameter similar to the diameter of orifice 58A. Alternatively, each orifice of partition 56 may have a diameter smaller than that of orifice 58A in order to obtain a law governing the flow of drained liquid between collection space 54A and transfer space 54B that is similar to the law obtained when only orifice 58A traverses partition 56. "Law governing the flow of drained liquid" is understood here to mean the volume of drained liquid which is transferred, per unit of time, between collection space 54A and transfer space 54B.

When several orifices traverse partition 56, these may be arranged at the same height relative to bottom wall 16 of collector 10 or at different heights. When each orifice of partition 56 is arranged at a different height, the law governing the flow of drained liquid between collection space 54A and transfer space 54B is different for each orifice. In particular, the further the orifice in partition 56 is from bottom wall 16 of collector 10, the slower the flow of the drained liquid. Firstly, the further the orifice of the partition is from bottom wall 16, the greater the amount of drained liquid collected in the collection space must be in order to initiate the flow of drained liquid through this orifice. Also, if other orifices are arranged closer to bottom wall 16, the drained liquid preferentially flows through them.

According to an alternative embodiment, restriction means 58 could be an added nozzle (not shown) installed in an opening of the partition.

Advantageously, restriction means 58 is arranged vertically above bottom wall 16 of the collector. This avoids having restriction means 58 in an area where impurities accumulate, where the risk of clogging in restriction means 58 is increased.

One will note that restriction means 58 is preferably mounted so that it is removable from the collector by moving the drained liquid passage restriction means along direction Z, in the directional sense that is from bottom wall 16 of the collector towards cover 14 of the collector. This allows restriction means 58 to be extracted from the collector for regular cleaning, in order to reduce the risk of clogging in restriction means 58. In addition, since restriction means 58 is extracted by its movement along the directional sense that is from bottom wall 16 towards cover 14 of the collector, the drained liquid collected in internal cavity 54 of the collector is not likely to escape through bottom wall 16 when restriction means 58 is extracted from collector 10. Advantageously, when extracting restriction means 58, cover 14 is removed from the collector. However, according to a variant that is not illustrated, cover 14 may comprise a through-opening in wall 40, through which restriction means 58 may be extracted without needing to remove cover 14.

Restriction means 58 may be moved along direction Z independently of partition 56 or integrally with partition 56, as will be detailed below.

In FIG. 1, partition 56 forms a separating wall extending substantially vertically into internal cavity 54 from bottom wall 16 of the collector. Separating wall 56 may be attached to bottom wall 16, either fixedly or removably. When separating wall 56 is removably mounted on the bottom wall, restriction means 58 may be extracted from collector 10 by vertically moving partition wall 56 along the directional sense that is from bottom wall 16 to cover 14. Alternatively, partition wall 56 may be formed as one piece with bottom wall 16 of the collector.

Separating wall 56 comprises a main wall extending radially facing a portion of inner face 32 of side wall 18 of body 12, and two secondary walls (not shown) which radially connect the ends of the main wall to inner face 32 of side wall 18. Transfer space 54B is then delimited between separating wall 56 and inner face 32 of side wall 18. Separating wall 56 is arranged in internal cavity 54 such that the inlet into second cavity 26 is comprised in transfer space 54B.

Advantageously, separating wall 56 does not extend as far as cover 14, which allows the air in collection space 54A to be in communication with the air in transfer space 54B. The air pressure in collection space 54A and in transfer space 54B is therefore identical.

One will note that restriction means 58 is arranged on an end part of separating wall 56 which is connected at its end to bottom wall 16 of collector 10.

In FIG. 2, partition 56 forms a tube 60. Reference is now made to FIGS. 3 to 5 in order to describe tube 60.

As can be seen in FIG. 3, tube 60 extends in a longitudinal direction L1. As can be seen in FIG. 2, when tube 60 is arranged in internal cavity 54 of collector 10, longitudinal direction L1 is substantially parallel to axis A1 of collector 10.

Tube 60 is hollow and substantially cylindrical, with a circular or polygonal cross-section.

Tube 60 comprises a first end part 60A and a second end part 60B which are interconnected by an intermediate part 60C.

First end part 60A will now be described with reference to FIG. 4.

First end part 60A of tube 60 carries passage restriction means 58. In the figures, passage restriction means 58 comprises a single orifice 58A, but it could comprise several orifices or could be formed by a nozzle attached in an opening, as indicated above.

First end part 60A of tube 60 comprises an insertion portion 62. The insertion portion is shaped for insertion into a housing in the bottom wall of collector 16, as can be seen in FIG. 2. The housing in the bottom wall is in fluid communication with recovery outlet 30. In this case, the housing in bottom wall 16 corresponds to first portion 26A of cavity 26.

Insertion portion 62 is fitted into housing 26A. Insertion portion 62 advantageously comprises a groove 64, preferably annular, in which is mounted an annular gasket 66, visible in FIG. 6. Gasket 66 ensures the liquid-tightness of the tube 60 mounted in housing 26A of bottom wall 16. In particular, gasket 66 limits the flow of the drained liquid between the surface of housing 26A and insertion portions 62. Alternatively, the liquid-tightness of the mounting of the tube may be a faceseal via a gasket or via metal-metal contact.

Preferably, tube 60 is mounted in housing 26A so as to be removable. This makes it possible to extract tube 60 from internal cavity 54 of collector 10 by moving it along direction Z in the directional sense that is from bottom wall 16 towards cover 14, as indicated above. It is thus possible to clean passage restriction means 58 and to monitor that it is not clogged, as is also explained above.

First end part 60A further comprises a stop member 68 for abutting against bottom wall 16. Stop member 68 projects radially outward from tube 60 in relation to insertion portion 62. Thus, when insertion portion 62 of tube 60 is inserted into housing 26A, stop member 68 abuts against the inner face of bottom wall 16. In the figures, stop member 68 is a flange, but any other shape projecting radially outward from tube 60 in relation to insertion portion 62 is conceivable.

Stop member 68 is arranged between passage restriction means 58 and insertion portion 62. This allows ensuring that passage restriction means 58 is arranged at a height that is between bottom wall 16 of the collector and cover 14 of the collector, which prevents it, as indicated above, from being positioned in an area where impurities accumulate which would facilitate clogging.

Second end part 60B of tube 60 will now be described with reference to FIG. 5.

Second end part 60B carries at least one pressure-balancing orifice 70 which places the air in collection space 54A in communication with the air in transfer space 54B. In particular, pressure-balancing orifice 70 traverses tube 60, between first space 54A and second space 54B of internal cavity 54.

Preferably, the second end part carries a plurality of pressure-balancing orifices 70 distributed equidistantly around longitudinal direction L1 of tube 60. For example, the second end part of tube 60 carries six pressure-balancing orifices 70.

Each pressure-balancing orifice is sized to allow the pressure in collection space 54A to be identical to the pressure in transfer space 54B. Advantageously, the diameter of each pressure-balancing orifice is greater than the diameter of passage restriction means 58, in particular of orifice 58A. For example, each pressure-balancing orifice has a diameter that is greater than 1.5 mm and less than 3 mm. Preferably, the diameter of each pressure-balancing orifice is between 1.7 mm and 2.5 mm. For example, the diameter of each pressure-balancing orifice is equal to 2 mm.

In order to avoid the vibratory movements to which second end part 60B may be subjected due to the presence of the drained liquid in collection space 54A, second end part 60B of tube 60 is preferably connected to cover 14. For this purpose, second end part 60B comprises a connecting pin 72, and cover 14 comprises a cap 74 which is visible in FIGS. 2 and 6. As can be seen in FIG. 2, pin 72 and cap 74 have complementary shapes, which allows locking pin 72 in cap 74. In one variant, tube 60 could also traverse cover 14, in particular wall 40 of cover. Tube 60 may thus be centered in and/or fixed on cover 14.

As can be seen in 1, 2 and 6, collection space 54A further comprises an overflow channel 76. A first end of overflow channel 76 is connected to discharge outlet 28. Overflow channel 76 therefore is in fluid communication with discharge outlet 28. This discharge outlet comprises a connector 28A which allows connecting a pipe (not illustrated) to collector 10, placing collector 10 in communication with outside the turbine engine.

A second end of overflow channel 76 comprises an inlet port 78 for the intake of liquid collected in collection space 54A. Inlet port 78 is arranged vertically at a height relative to bottom wall 16 of the collector that is between the height of restriction means 58 and that of pressure-balancing orifice (s) 70. When restriction means 58 comprises several orifices as explained above, inlet port 78 is arranged vertically at a height that is between the orifice of restriction means 58 which is vertically furthest from bottom wall 16, and pressure-balancing orifice(s) 70. The height of inlet port 78 defines a level referred to as the "overflow level".

In the figures, overflow channel 76 extends along direction Z, but any other shape of the overflow channel is possible provided that inlet port 78 is arranged in collection space 54A and the first end of overflow channel 76 is fluidly connected to discharge outlet 28.

The operation of collector 10 when in service will now be described.

Firstly, the drained liquid reaches collection space 54A through one of inlets 54A. The height of the drained liquid in collection space 54A gradually increases. The height of the drained liquid is measured vertically relative to bottom wall 16 of collector 10.

When the drained liquid reaches the height of restriction means 58, the liquid begins to flow from collection space 54A towards transfer space 54B, through restriction means 58. The drained liquid therefore begins to exit collector 10 via recovery outlet 30.

If the flow rate of drained liquid arriving in collection space 54A is greater than the flow rate of drained liquid flowing through restriction means 58, the height of the drained liquid in the cavity exceeds the height of restriction means 58 and may reach the overflow level. In this case, the drained liquid also begins to flow through overflow channel 76 towards discharge outlet 28. The drained liquid is therefore discharged to outside the turbine engine, which may indicate a failure of the turbine engine.

The present invention also relates to a turbine engine, such as a turbojet or turboprop engine, comprising at least one collector 10 as described above.

One will note that due to the equalization of pressures between the collection space and the transfer space, in the collector described above, the pressure difference across the drained liquid passage restriction means depends solely on the height of drained liquid collected in collection space 54A. The conditions for use of the collector, such as the increase in air pressure in internal cavity 54 of collector 10 or the flow rate of drained liquid entering internal cavity 54, as well as the installation conditions of collector 10, for example the length of the pipes at the outlet of the collector, therefore have no impact on the pressure difference across flow rate restriction means 58.

Furthermore, since the pressure difference across flow rate restriction means 58 is independent of the installation conditions of collector 10 and the conditions for its use, in particular the air pressure in internal cavity 54, it is possible to control the flow rate of drained liquid beyond which the liquid will overflow through overflow channel 76. This therefore allows controlling a leakage flow rate threshold for the drained liquid, beyond which a failure of the turbine engine is detected due to the overflow of drained liquid through overflow channel 76.

This disclosure is not limited to the collector examples described above solely as an example, but encompasses all variants conceivable to the person skilled in the art within the framework of the protection sought.

The invention claimed is:

1. A collector for a drained liquid for an aircraft turbine engine, the collector comprising:
  an internal cavity comprising a first space for collecting the drained liquid and a second space for transferring the collected liquid to a recovery outlet;
  at least one inlet for the drained liquid, in fluid communication with the first space; and
  at least one recovery outlet, in fluid communication with the second space;
  wherein the first space and the second space are separated from each other by a liquid-tight partition in which is arranged a drained liquid passage restriction means which restricts the passage of the drained liquid from the first space to the second space, the air in the first space being in communication with the air in the second space such that the air pressure is identical in the first space and in the second space.

2. The collector according to claim 1, wherein the drained liquid passage restriction means comprises at least one orifice traversing the partition.

3. The collector according to claim 1, wherein the drained liquid passage restriction means comprises at least two orifices traversing the partition.

4. The collector according to claim 1, wherein the drained liquid passage restriction means comprises at least two orifices traversing the partition at different heights.

5. The collector according to claim 1, further comprising a discharge outlet that is fluidly connected to an overflow channel.

6. The collector according to claim 5, wherein the overflow channel comprises an inlet port for the intake of liquid collected in the first space, said inlet port being arranged at a height that is greater than the height of the drained liquid passage restriction means.

7. The collector according to claim 6, wherein the partition forms a tube delimiting the second space.

8. The collector according to claim 7, wherein the tube extends in a longitudinal direction and comprises a first end part carrying the drained liquid passage restriction means and a second end part carrying at least one pressure-balancing orifice which places the air of the first space in communication with the air of the second space.

9. The collector according to claim 8, wherein the at least one pressure-balancing orifice is arranged at a height that is greater than the height of the inlet port for the intake of drained liquid into the overflow channel.

10. The collector according to claim 5, the overflow channel being arranged in the first space of the internal cavity.

11. The collector according to claim 1, wherein the partition forms a tube delimiting the second space.

12. The collector according to claim 11, wherein the tube extends in a longitudinal direction and comprises a first end part carrying the drained liquid passage restriction means and a second end part carrying at least one pressure-balancing orifice which places the air of the first space in communication with the air of the second space.

13. The collector according to claim 12, wherein the at least one pressure-balancing orifice has a diameter that is greater than the diameter of the drained liquid passage restriction means.

14. A turbine engine comprising at least one collector according to claim 1.

15. The turbine engine according to claim 14, further being a turbojet.

16. The turbine engine according to claim 14, further being a turboprop engine.

* * * * *